United States Patent [19]

Takenaka et al.

[11] 4,392,914

[45] Jul. 12, 1983

[54] METHOD FOR MANUFACTURING MASK FOR COLOR CRT

[75] Inventors: Shigeo Takenaka; Eiji Kamohara; Kazuyuki Seino, all of Fukaya, Japan

[73] Assignee: Tokyo Shibaura Denki Kabushiki Kaisha, Kawasaki, Japan

[21] Appl. No.: 413,896

[22] Filed: Sep. 1, 1982

[30] Foreign Application Priority Data

Sep. 10, 1981 [JP] Japan ........................ 56-141739

[51] Int. Cl.$^3$ ........................ B44C 1/22; C03C 15/00; C03C 25/06

[52] U.S. Cl. ........................ 156/633; 156/645; 156/654; 156/221; 313/402

[58] Field of Search ............... 156/629, 630, 633, 634, 156/644, 645, 654-656, 659.1, 196, 212, 214, 221, 224, 252, 290, 291; 29/25.13-25.19; 313/402, 407, 408; 430/23

[56] References Cited

U.S. PATENT DOCUMENTS

| | | | |
|---|---|---|---|
| 3,574,013 | 4/1971 | Frantzen | 156/644 X |
| 3,909,656 | 9/1975 | Stachniak | 156/644 X |
| 4,112,563 | 9/1978 | VanEsdonk | 29/25.14 |

*Primary Examiner*—William A. Powell

*Attorney, Agent, or Firm*—Cushman, Darby & Cushman

[57] ABSTRACT

A method for manufacturing a mask for a color CRT. The mask comprises a plurality of mask members having a number of apertures for passing electron beems, and being spaced apart. The mask is produced by the steps of bringing the mask members into tight contact with an insulator interposed between their peripheries; fixing them by an adhesive; press forming the entire composite; melting the adhesive; and shifting apart and fixing the mask members at a predetermined distance.

9 Claims, 6 Drawing Figures

METHOD FOR MANUFACTURING MASK FOR COLOR CRT

BACKGROUND OF THE INVENTION

The present invention relates to a method for manufacturing a mask for a color CRT (cathode ray tube), which comprises a plurality of mask members spaced apart from each other at predetermined intervals near a screen, and having a number of apertures through which electron beams can pass.

A mask focusing type CRT is known well as a color CRT of the type described above. In the mask focusing type color CRT, a plurality of mask members which oppose each other at the predetermined intervals are kept at predetermined potentials so as to form electrostatic lenses for electron beams passing through a number of apertures of the mask members. Thus, the electron beams are efficiently used. The mask focusing type CRTs of this type are described in Japanese Utility Model Publication No. 45-4819, Japanese Utility Model Publication No. 47-20451, U.S. Pat. No. 2,971,117, and U.S. Pat. No. 3,398,309.

Another example of a color CRT of the type mentioned above is described in Japanese Patent Publication No. 55-2698. The color CRT comprises double masks wherein which are disposed to prevent mislanding due to thermal deformation caused by a temperature rise of the mask.

In the mask focusing type color CRT or the color CRT which has two mask members, apertures of one mask member must be disposed to correspond to apertures of the other mask member over the entire area thereof. However, manufacture of such a mask is very difficult.

Japanese Patent Publication No. 47-28188 and Japanese Patent Publication No. 47-28189 propose methods for manufacturing a mask having the above structure. However, since a glass insulator is disposed between mask members excluding apertures, forming of the mask is rather poor. Further, the glass insulator is electrically charged by beam bombardment, which adversely affects the electron beams passing through the apertures. Therefore, these methods are not industrially applicable in practice.

SUMMARY OF THE INVENTION

It is, therefore, an object of the present invention to provide a method for manufacturing a mask for a color CRT wherein an insulator may not be electrically charged by beam bombardment, electron beams passing through apertures in a plurality of mask members may not be adversely affected, and the plurality of mask members are highly precisely aligned over the entire surface of the mask.

In order to achieve the above object of the present invention, there is provided a method for manufacturing a mask for a color CRT in which a plurality of flat mask members each having a number of apertures in an effective area thereof are formed, and the plurality of flat mask members are fixed at predetermined distances with the apertures thereof being aligned with each other, comprising the steps of:

bringing into tight contact and fixing in position at least parts of said effective areas which have said apertures of said flat mask members with an insulator interposed between peripheral portions surrounding said effective areas of said plurality of flat mask members;

press forming said plurality of flat mask members to provide a predetermined radius of curvature thereto; and fixing said effective areas in position at said predetermined distances after shifting apart said plurality of mask members.

DETAILED DESCRIPTION OF THE PREFERRED EMBODIMENTS

A method for manufacturing a mask for a mask focusing type color CRT which has two mask members will be described with reference to the accompanying drawings.

Figure 1:
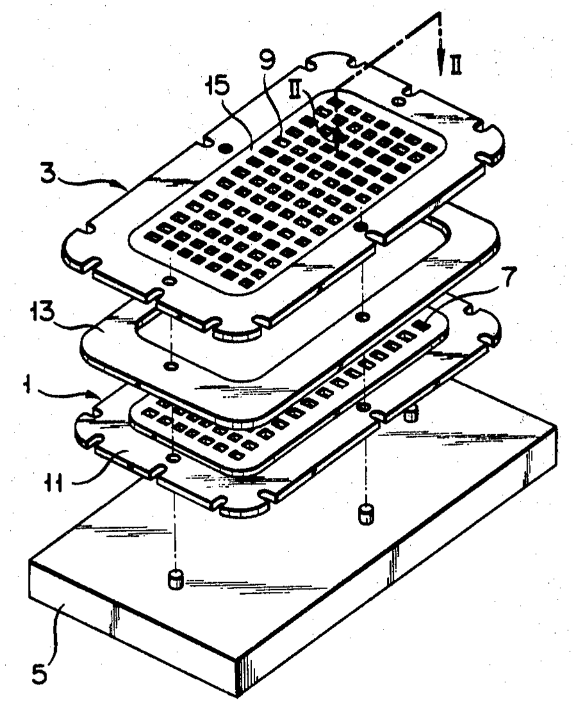
FIG. 1 is a schematic fragmentary perspective view for explaining a step of manufacturing a mask for a color CRT according to the present invention.
Figure 2:
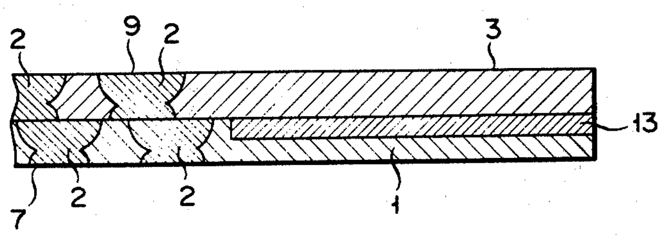
FIG. 2 is a sectional view of the mask along the line II—II of FIG. 1.

Referring to FIG. 1 and FIG. 2, flat mask members 1 and 3 are overlaid and aligned with each other on a table 5. Paraffin 2 or the like is filled in apertures 7 and 9 and is hardened to fix the two flat mask members 1 and 3. The two flat mask members 1 and 3 are press formed simultaneously. Thereafter, the paraffin 2 is removed from the apertures 7 and 9. In order to keep flat the upper and lower surfaces of an assembly comprising the formed mask members 1 and 3, a surface of a peripheral portion 11 (or a skirt portion) surrounding an effective area (portion which has the apertures 7) of the mask member 1 is etched. This surface of the mask member 1 opposes the mask member 3. An insulating film 13 is formed in an etched portion to a thickness corresponding to an etched depth. The insulating film 13 may be formed in an etched portion of the mask member 3 in the same manner as described above. Alternatively, the insulating film 13 may be formed in both the mask members 1 and 3.

Figure 3A:
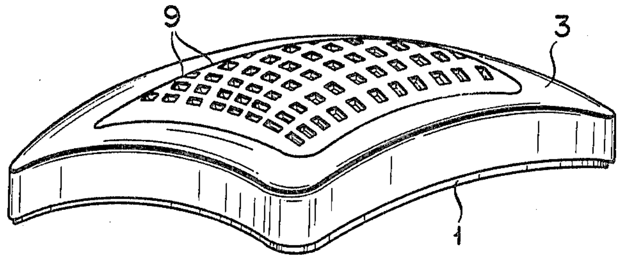
FIG. 3(A) is a perspective view of a composite of two mask members which has a predetermined radius of curvature.
Figure 3B:
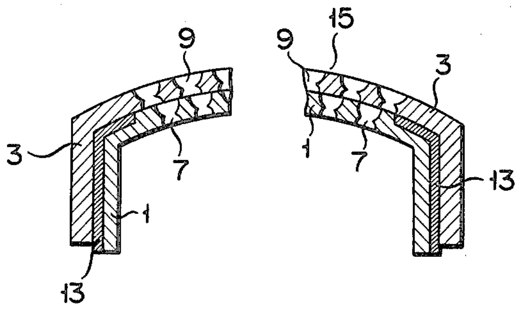
FIG. 3(B) is a partially cutaway sectional view of the composite shown in the FIG. 3(A)
Figure 4:
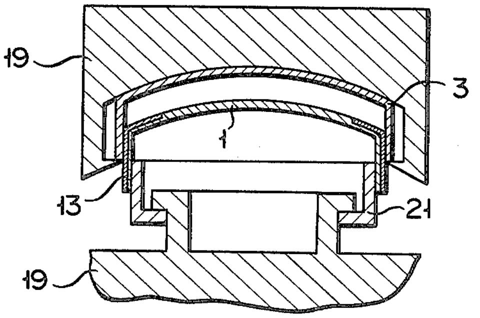
FIG. 4 is a schematic sectional view for explaining a step of separating two mask members at a predetermined distance.

A polyimide film which has good reproducibility, good heat resistance, and good insulation characteristics is preferred as the insulating film 13. The polyimide film may comprise Capton (trade name) which is a polyimide of 1,2,4,5-benzenetetracarboxylic acid (anhydride) and 4,4'-diaminodiphenyl ether. The mask can be press-formed as shown in FIG. 3(A). The flat mask members 1 and 3 formed in this manner are not subject to misalignment or disarrangements in elongation, as shown in FIGS. 3(A) and 3(B). Effective areas 15 of the flat mask members 1 and 3 with the apertures tightly contact with each other. The peripheral portions 11 of the flat mask members 1 and 3 tightly contact with each other through the insulating film 13. As shown in FIG. 2 or 3(B), the apertures 7 and 9 of the flat mask members 1 and 3 are deviated from each other at edges of the effective areas 15 of the flat mask members 1 and 3 so as to readily align the incident axes of the electron beams with the apertures 7 and 9 when the flat mask members 1 and 3 are spaced apart from each other at a predetermined distance. At this time, one formed mask member is fixed while the other formed mask member is vertically moved for a predetermined distance and is fixed. In particular, the formed mask member 1 is welded on a frame 21, and the formed mask member 1 and the frame 21 are fixed by one jig 19, while the formed mask member 3 is moved upward by the other jig 19 by the predetermined distance, as shown in FIG. 4. Subsequently, the formed mask members 1 and 3 are caulked and are mechanically fixed in position relative to each other.

The specifications of the mask are as follows: the outer dimensions of the two flat mask members are about 428 mm×330 mm; the effective area is about 382 mm×290 mm; the thickness of the mask member is 0.30 mm; the thickness of the insulating film and the thickness of the etched portion outside the effective area of the mask member 1 is about 0.125 mm; the radius of curvature of the effective area of the formed mask is about 740 mm to 800 mm; and the length of the skirt portion (peripheral portion) is about 15 mm. In the mask manufactured with the dimensions described above, the apertures 7 and 9 of the formed mask members 1 and 3 are aligned in one-to-one correspondence. The insulator is not present within the effective area of the formed mask members 1 and 3 which respectively have apertures 7 and 9. The insulating film is disposed between the formed mask members 1 and 3 but only in the peripheral portions outside the effective areas. The formed mask members 1 and 3 are insulated from each other through the insulating film. Since the electron beam may not be adversely affected by the electric charge on the insulating film, industrial application of the mask is facilitated.

In the above embodiment, the two formed mask members are fixed relative to each other by caulking. However, the formed mask members may be fixed with an adhesive. An insulating rod may extend through the formed mask members. Alternatively, the formed mask member 3 may be fixed on another frame, while the formed mask member 1 is fixed on the frame 21. The formed mask members 1 and 3 may be separately fixed to the panel in the color CRT. The above embodiment is described with reference to the mask focusing type color CRT wherein different voltages are applied across the formed mask members 1 and 3. However, the present invention may also be applied to a case in which the same voltage is applied to two formed mask members, and another case in which two formed mask members are thermally insulated from each other.

Further, in the above embodiment, the polyimide film is used as the insulating film disposed between the formed mask members 1 and 3. However, the present invention is not limited to this. An insulator need not be in the form of a film if it has a thermal resistance at high temperatures of about 400° to 500° C.

A mask according to another embodiment of the present invention will be described in which frit glass is used in place of the polyimide film. One flat mask member whose peripheral portion is etched is placed on the table, a frit glass rendered a given viscosity by a binder is coated on the etched portion. Thereafter, the other flat mask member is placed on one flat mask. In the same manner as in the first embodiment, paraffin is filled in the apertures and is hardened. The two flat mask members are press formed simultaneously. Thereafter, the paraffin is removed from the apertures. The paraffin is then injected in the end portions of the etched portion in order to prevent the outflow of the frit glass and deformation of the peripheral portions of the flat mask members. Note that the viscosity of the frit glass coating is slightly lowered prior to press formation of the flat mask members. In the two formed mask members, one formed mask member is welded on a frame which is fixed by a jig, while the other formed mask member is separated from one formed mask member with another jig in the same manner as described in the first embodiment. In this state, part of the skirt portion of the other formed mask member is further covered with frit glass from the frit glass coating on one formed mask member. The assembly is then heated in a high-temperature furnace to harden the frit glass coating. Thereafter, the two formed mask members are removed from the jigs. According to the above-mentioned method for manufacturing the mask, although the high-temperature furnace is required, and the manufacturing cost is slightly high, and mass production is slightly disadvantageous, but mechanical strength of the formed mask members which are fixed and are spaced apart from each other is greatly improved.

In the above embodiments, paraffin is used to fix the two flat mask members. However, the present invention is not limited to paraffin as a means for fixing the two flat mask members. For example, a resin or an adhesive may be used in place of the paraffin.

In the above embodiments, two mask members are used. However, according to the present invention, a mask comprising more than two mask members can be, as a matter of fact, manufactured in the same manner as described above.

Figure 5:
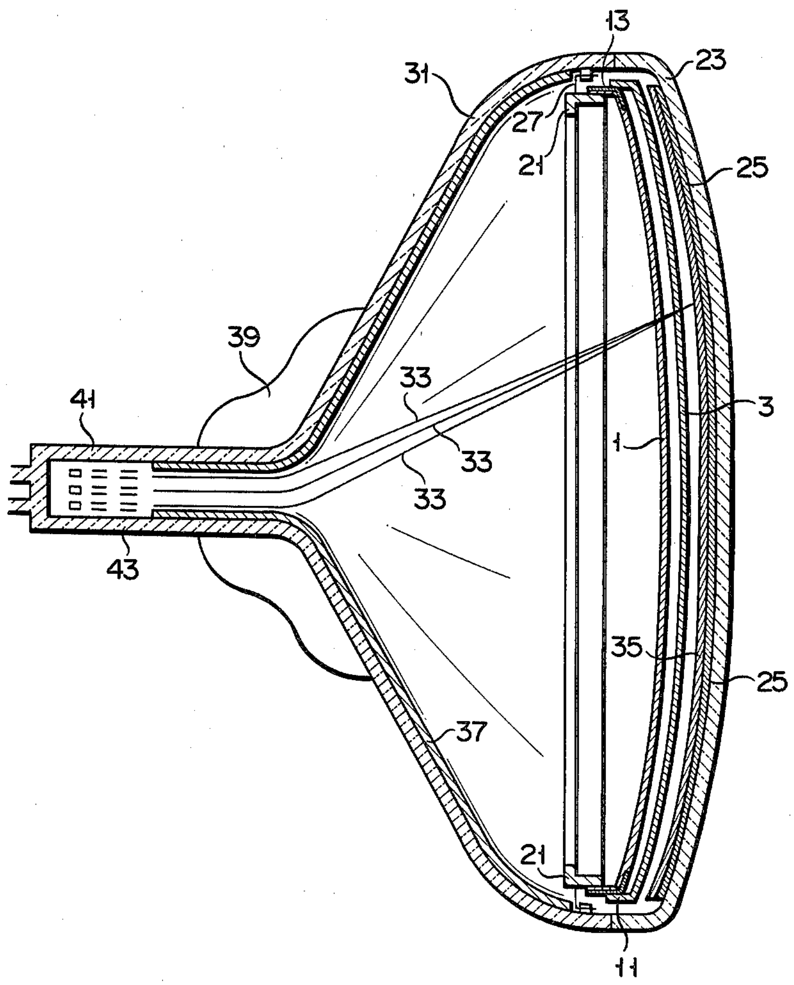
FIG. 5 is a schematic sectional view of a mask focusing type color CRT to which a mask according to the present invention is applied.

FIG. 5 shows an example of a mask focusing type color CRT to which a mask manufactured by a method according to the present invention is applied. Referring to FIG. 5, a screen 25 on which phosphors for emitting light rays of the primaries are arranged is disposed immediately inner surface of a panel 23. Pins 27 are disposed at sides of the panel 23 to hold the frame 21 in the CRT. The mask member 1 having a number of apertures 7 is welded on the frame 21. The skirt portion 11 of the mask member 3 having a number of apertures 9 is mechanically fixed to the skirt portion 11 of the mask member 3 through the insulating film 13. The same voltage as applied across the screen 25 is applied across the mask member 1 from a funnel portion 31 through the frame 21 via a connector (not shown). A voltage different from the above-mentioned voltage is applied across the mask member 3 from the funnel 31 via another connector (not shown).

Electron beams 33 pass through the apertures of the mask member 1 while being effected by the electrostatic lens action. The electron beams 33 then pass through the apertures of the mask members 3 and reach the screen 25. The electron beams 33 cause the corresponding phosphors to emit light rays.

It is noted that reference numerals 35, 37, 39, 41 and 43 respectively denote a metallized screen layer, a conductive film, a deflector unit, a neck, and an electron gun.

In summary, since the plurality of mask members can be manufactured while their apertures are properly aligned by a fixing material such as paraffin, the aperture misalignment does not occur when the CRT is manufactured. Further, since the plurality mask members are simultaneously press formed in the same manner as in the conventional color CRT, and since the mask members are electrically insulated from each other and are spaced apart from each other at a predetermined distance even if the skirt portion are bent too much, the mask according to the present invention provides advantages in industrial applications. Further, since no insulator is present within the mask effective areas where a number of apertures are formed, the insulator may not be electrically charged, so that the electron beams may not be adversely affected when they pass therethrough. Further, since the skirt portion can be bent deep in the same manner as the conventional color CRT, no excessive space is required. Further, the conventional frame can be used without modification.

What we claim is:

1. A method for manufacturing a mask for a color CRT in which a plurality of flat mask members each of which has a number of apertures in an effective area thereof are formed, and the plurality of mask members are fixed at predetermined distances with the apertures thereof being aligned with each other, comprising the steps of:

bringing into tight contact and fixing in position at least parts of said effective areas which have said apertures of said flat mask members with an insulator interposed between peripheral portions surrounding said effective areas of said plurality of flat mask members;

press forming said plurality of flat mask members to provide a predetermined radius of curvature thereto; and fixing said effective areas in position at said predetermined distances after shifting apart said plurality of mask members.

2. A method according to claim 1, wherein said insulator is formed in said peripheral portion of at least one of said mask members by etching said peripheral portion, a thickness of said insulator being substantially equal to a thickness of an etched portion.

3. A method according to claim 1 or 2, wherein said insulator comprises a polyimide resin.

4. A method according to claim 1 or 2, wherein said insulator comprises frit glass.

5. A method according to claim 1, wherein said effective areas are fixed in position by filling paraffin in said apertures.

6. A method according to claim 1, wherein said effective areas are fixed in position by an adhesive.

7. A method according to claim 1, wherein said mask comprises two mask members.

8. A method according to claim 1, said insulator has a heat resistance to withstand a temperature of 400° to 500° C.

9. A method according to claim 1, wherein the press formation step comprises bending of an intermediate portion of an insulator formation part.

* * * * *